US009089090B2

(12) United States Patent
Claes et al.

(10) Patent No.: US 9,089,090 B2
(45) Date of Patent: Jul. 28, 2015

(54) COMBINE HARVESTER HAVING A GRAIN TANK WITH AN UPPER OPENING WITH A FOLDABLE ATTACHMENT

(71) Applicant: CLASS Selbstfahrende Erntemaschinen GmbH, Harsewinkel (DE)

(72) Inventors: Ulrich Claes, Dissen (DE); Thomas Roewekamp, Wallenhorst (DE); Egbert Scholz, Bielefeld (DE); Georg Paulessen, Willich (DE)

(73) Assignee: CLAAS Selbstfahrende Erntemashinen GmbH, Harsewinkel (DE)

( * ) Notice: Subject to any disclaimer, the term of this patent is extended or adjusted under 35 U.S.C. 154(b) by 192 days.

(21) Appl. No.: 13/874,564

(22) Filed: May 1, 2013

(65) Prior Publication Data
US 2013/0296005 A1 Nov. 7, 2013

(30) Foreign Application Priority Data
May 4, 2012 (DE) .......................... 10 2012 009 041

(51) Int. Cl.
*A01D 41/12* (2006.01)

(52) U.S. Cl.
CPC .................................. *A01D 41/1226* (2013.01)

(58) Field of Classification Search
CPC ........... A01D 41/1226; A01D 41/1208; A01D 46/082; A01C 15/005; A01C 15/006; B65D 88/005; B65D 88/52
USPC ............ 460/119, 23; 56/14.7; 296/15, 26.07, 296/100.01, 26.04, 26.05; 414/293, 295, 414/502, 505
See application file for complete search history.

(56) References Cited

U.S. PATENT DOCUMENTS

| | | | | |
|---|---|---|---|---|
| 4,106,649 A | * | 8/1978 | Nelson et al. | 414/505 |
| 4,466,549 A | * | 8/1984 | Hanaway | 220/4.03 |
| 5,151,064 A | * | 9/1992 | Damman et al. | 460/23 |
| 5,427,572 A | * | 6/1995 | Deutsch et al. | 460/119 |
| 6,074,298 A | * | 6/2000 | Majkrzak et al. | 460/119 |
| 6,126,220 A | * | 10/2000 | Brasher | 296/26.04 |
| 6,206,779 B1 | * | 3/2001 | Gerber et al. | 460/23 |
| 6,508,705 B1 | * | 1/2003 | Van Overschelde | 460/23 |
| 6,692,352 B2 | * | 2/2004 | Gerber et al. | 460/119 |
| 7,018,290 B2 | * | 3/2006 | Ramon et al. | 460/119 |
| 7,101,280 B2 | * | 9/2006 | Colpaert | 460/119 |
| 7,585,214 B1 | * | 9/2009 | Johnson et al. | 460/119 |
| 8,113,565 B2 | | 2/2012 | Zeuner et al. | |
| 2003/0232634 A1 | * | 12/2003 | Johnson et al. | 460/119 |
| 2004/0033823 A1 | * | 2/2004 | Stephens et al. | 460/119 |
| 2008/0261672 A1 | * | 10/2008 | Stukenholtz et al. | 460/119 |
| 2009/0270149 A1 | * | 10/2009 | Sprau | 460/119 |
| 2011/0095554 A1 | * | 4/2011 | Zeuner et al. | 296/15 |
| 2012/0155996 A1 | * | 6/2012 | Horst | 414/293 |
| 2013/0196724 A1 | * | 8/2013 | Barnes et al. | 460/119 |

FOREIGN PATENT DOCUMENTS

EP 1 564 157 8/2005

* cited by examiner

Primary Examiner — Árpád Fábián-Kovács
(74) Attorney, Agent, or Firm — Michael J. Striker

(57) ABSTRACT

A combine harvester includes a grain tank with an upper opening and a foldable attachment disposed on the upper opening. The attachment has two opposing, one-piece, flat attachment parts and two opposing, multiple-component, flat attachment parts. The attachment parts are swivellably disposed on the upper edge of the upper opening of the grain tank, are swivellably connected to one another and, in lying-flat, closed positions, form a cover. The cover at least partially closes the opening. In erected filling positions, the attachment parts increase the volume of the grain tank.

6 Claims, 8 Drawing Sheets

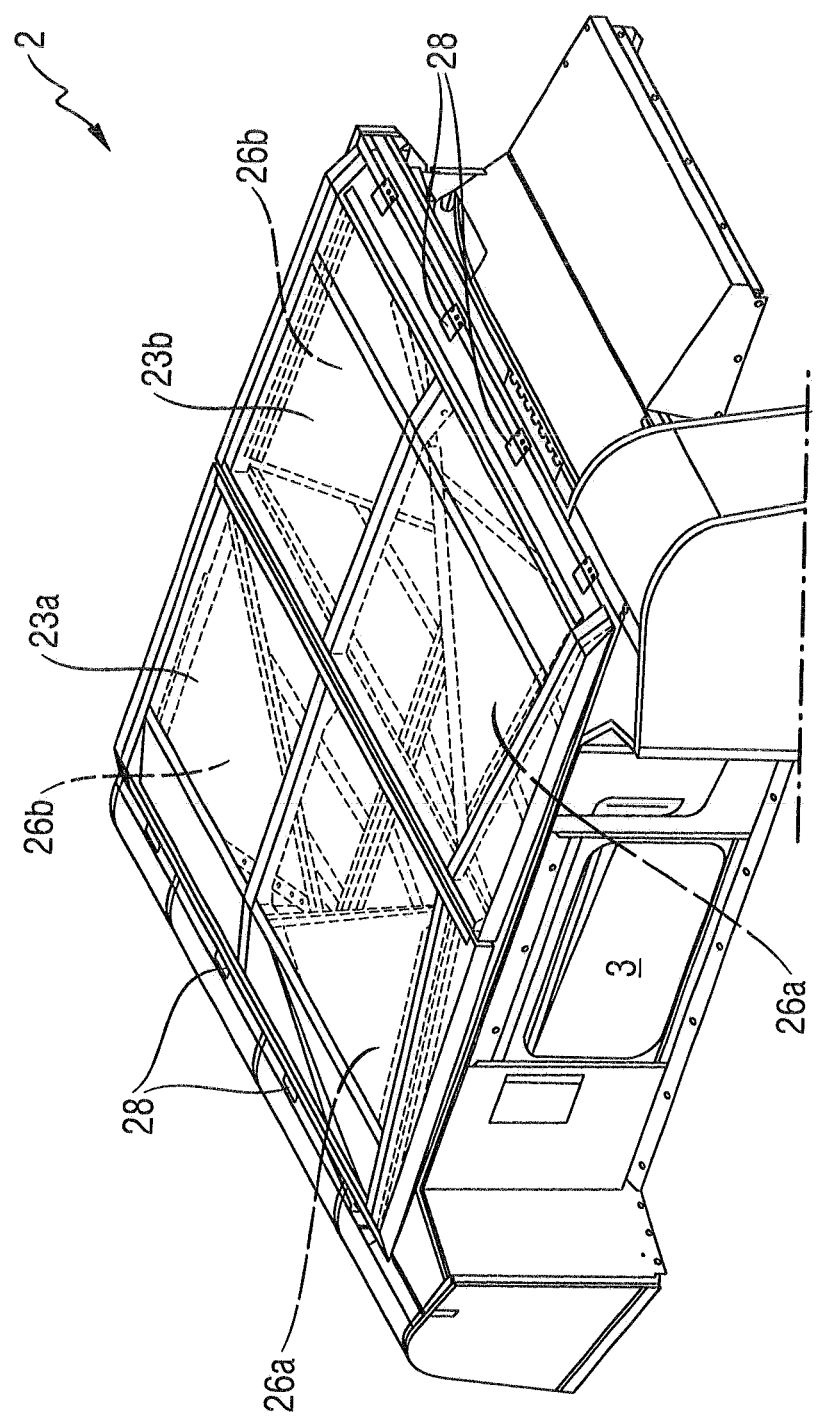

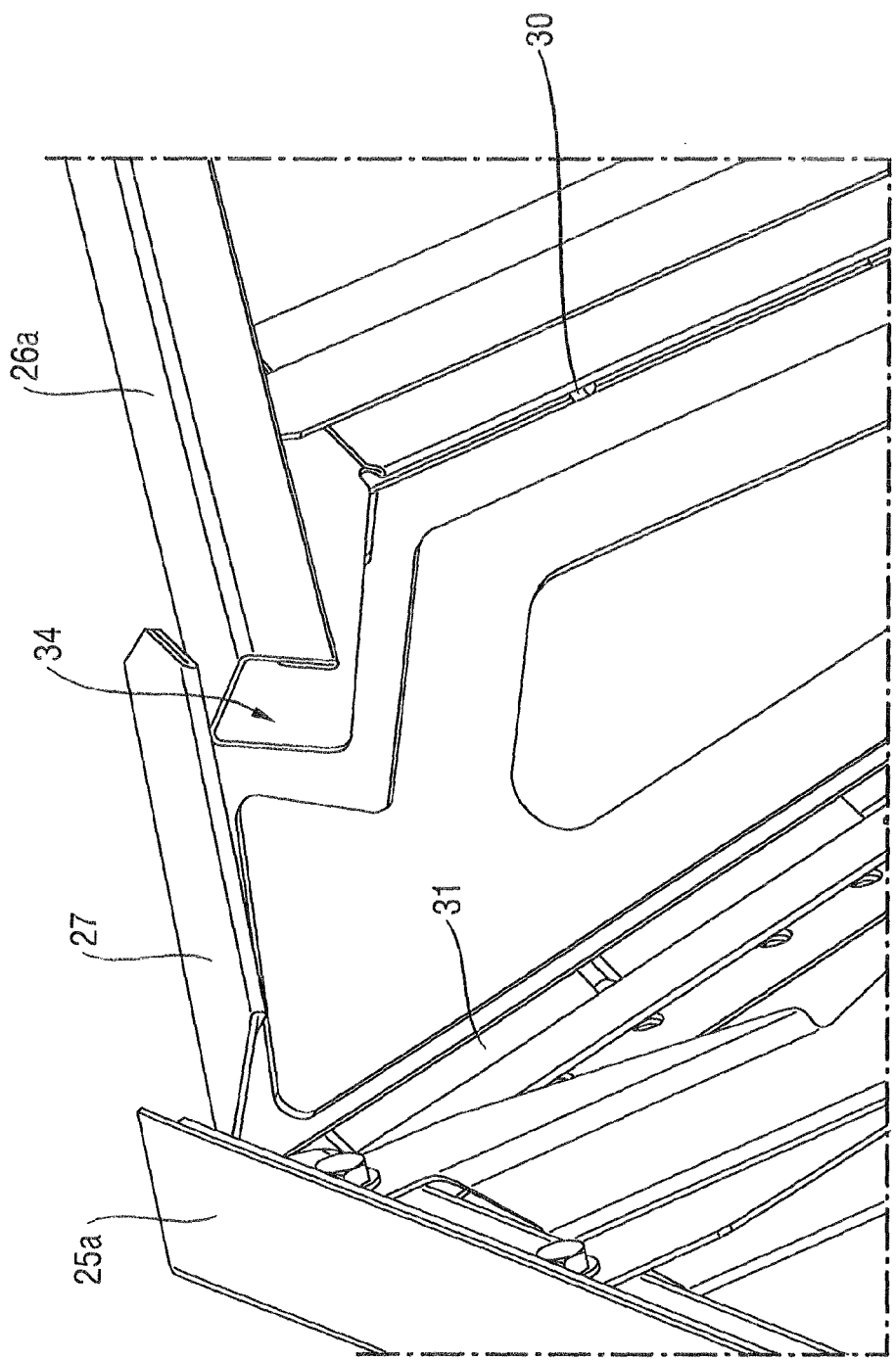

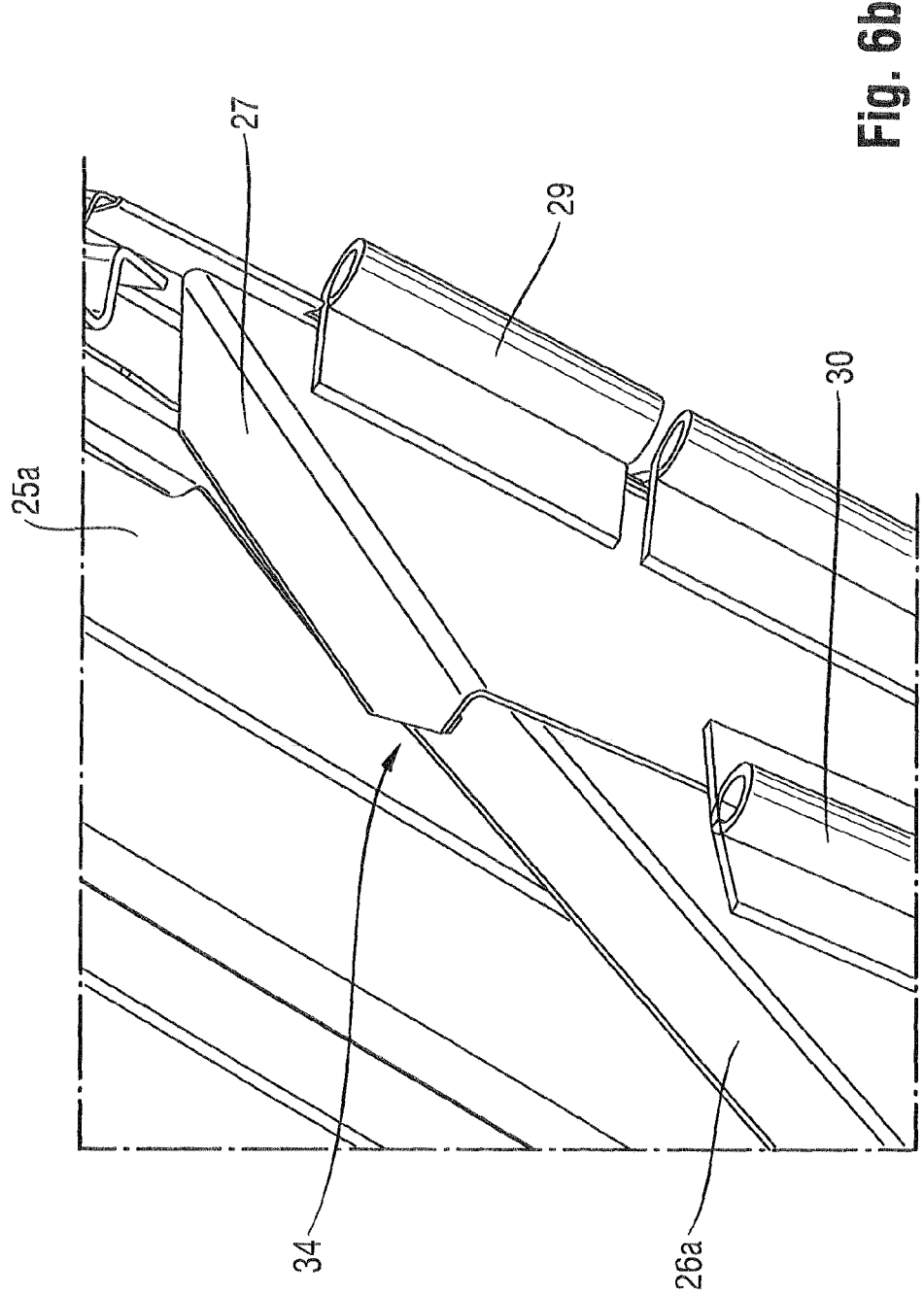

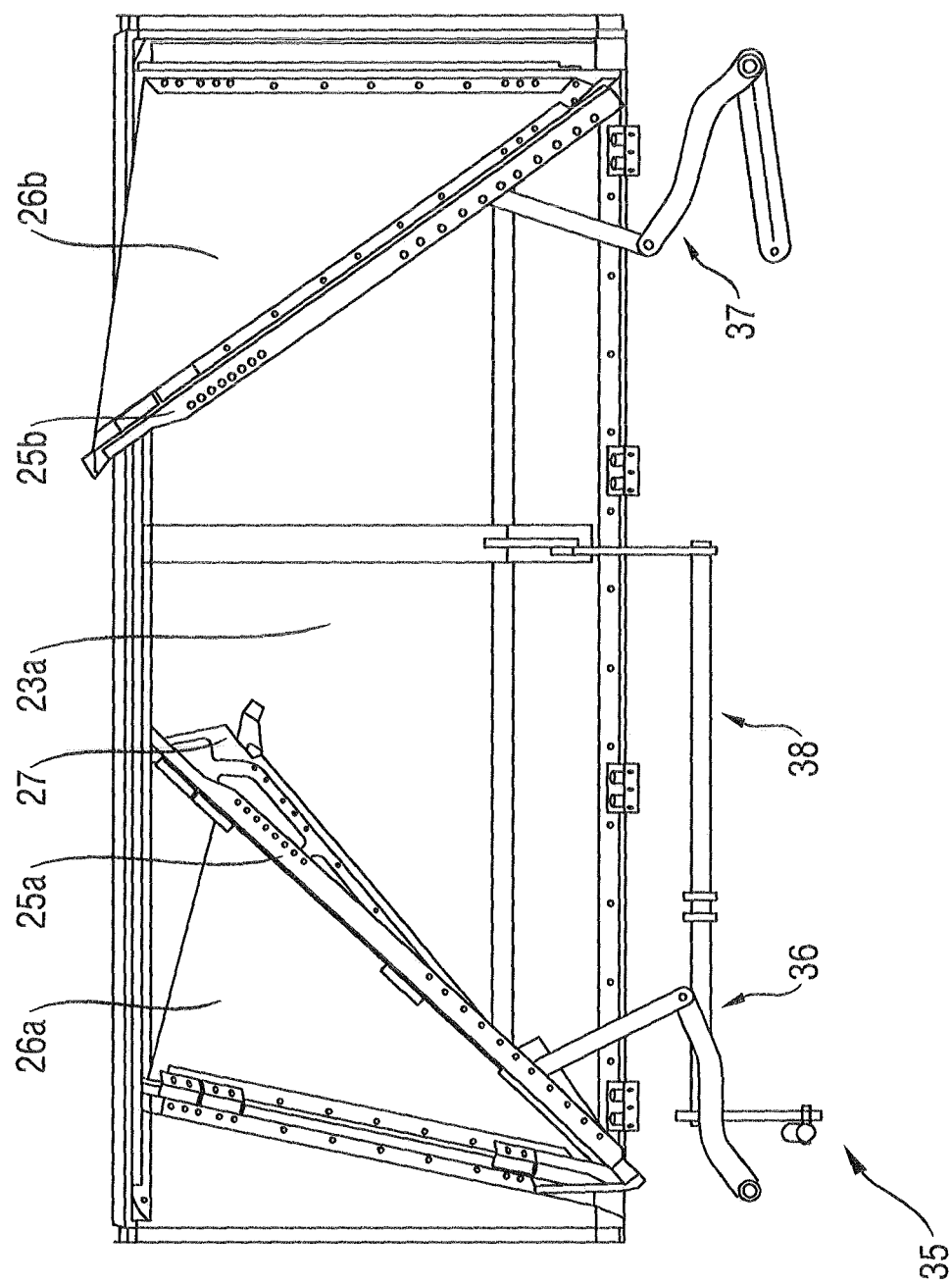

COMBINE HARVESTER HAVING A GRAIN TANK WITH AN UPPER OPENING WITH A FOLDABLE ATTACHMENT

CROSS-REFERENCE TO A RELATED APPLICATION

The invention described and claimed hereinbelow is also described in German Patent Application DE 10 2012 009041.2, filed on May 4, 2012. This German Patent Application, subject matter of which is incorporated herein by reference, provides the basis for a claim of priority of invention under 35 U.S.C. 119(a)-(d).

BACKGROUND OF THE INVENTION

The invention relates to a combine harvester with a grain tank having an upper opening and a foldable attachment. The foldable attachment is disposed on the upper opening and has two opposing, one-piece, flat attachment parts and two opposing, multiple-component, flat attachment parts. The attachment parts are swivellably disposed on the upper edge of the upper opening of the grain tank, are swivellably connected to one another and, in lying-flat, closed positions, form a cover, which at least partially closes the opening. The attachment parts additionally, in erected filling positions, increase the volume of the grain tank.

As is known, the grain tanks of combine harvesters are equipped with grain tank attachments having a plurality of side panels. The known side panels can be moved from closed positions into opened positions, and vice versa. During travel on the road, the side panels are folded into a closed position, thereby forming a cover and saving space, in order not exceed a specified overall height of the combine harvester. During operation on the field, the side panels are each raised into the opened positions thereof in order to increase the volume of the grain tank, thereby making it possible extend the intervals at which the grain tank is emptied.

For example, EP 1 564 157 A2 discloses a known combine harvester that includes a foldable attachment having two opposing, multiple-component attachment parts and two opposing, one-piece attachment parts. The multiple-component attachment parts each comprise two fold-in triangles, between which a center part is disposed, to which center part the fold-in triangles are connected by hinges. The multiple-component attachment parts of the attachment extend transversely to the direction of travel of the combine harvester and, in the lying-flat, closed position thereof, come to rest underneath the opposing, one-piece attachment parts. The dimensions of the opposing, one-piece or multiple-component attachment parts are selected such that each one is located in a plane in the lying-flat, closed position thereof, i.e., the face sides of the one-piece or multiple-component attachment parts adjoin one another in an opposed arrangement. The attachment parts are interconnected via hinges.

The hinged interconnection ensures that the attachment parts are forcibly guided upon transition from the closed position into the filling position, and vice versa. Due to the rectangular cross section of the grain tank (the extension of which is greater transversely to the direction of travel than in the direction of travel), the one-piece attachment parts are wider than the multiple-component attachment parts. It follows that the additional volume that can be obtained via the attachment with the attachment parts in the erected filling position is limited by the height of the multiple-component attachment parts. This is limited, in turn, by the arrangement of the multiple-component attachment parts in the closed position and by the forced guidance of the attachment parts.

SUMMARY OF THE INVENTION

The present invention overcomes the shortcomings of known arts, such as those mentioned above.

The invention provides a combine harvester having a grain tank volume that is increased by way of a foldable attachment.

In an embodiment, the invention provides a combine harvester with a grain tank having an upper opening. A foldable attachment is disposed on the upper opening, the foldable attachment comprising two opposing, one-piece, flat attachment parts and two opposing, multiple-components, flat attachment parts. The attachment parts are swivellably disposed on the upper edge of the upper opening of the grain tank, are swivellably connected to one another and in lying-flat, closed positions, form a cover that at least partially closes the opening. In erected filling positions, attachment parts increase the volume of the grain tank (3).

Motion sequences for transferring the multiple-component attachment parts from a closed position into a filling position, and vice versa, are decoupled from motion sequences of the one-piece attachment parts via an additional folding plane on one of the multiple-part attachment parts. Accordingly, the multiple-component attachment parts overlap in sections in the closed position. The overlap permits the multiple-component attachment parts to extend at the same height as the one-piece attachment parts, thereby increasing the grain tank volume.

Preferably, the multiple-component attachment part is formed of a trapezoidal central part bordered by two fold-in triangle pairs. Each of the two fold-in pairs comprises an inner fold-in triangle, which faces the central part, and an outer fold-in triangle, which faces the particular one-piece attachment part. Due to the additional inner fold-in triangle on one of the multiple-component attachment parts, the multiple-component attachment parts are folded up asymmetrically. The folding is decoupled from the forced guidance of the one-piece attachment parts to the extent that this multiple-component attachment part, in particular the central part thereof, follows a different trajectory than the central part of the opposing multiple-component attachment part.

Furthermore, the inner and the outer fold-in triangles of one pair are swivellably interconnected via a first hinge, and the inner fold-in triangle are swivellably connected to the central part via a second hinge.

Preferably, the inner fold-in triangles of the multiple-component attachment part function as spacers in the closed position thereof. The inner fold-in triangles tilt inwardly upon transition from the filling position into the closed position and are transferred into a substantially perpendicularly downwardly extending position. The central part is located between the inner fold-in triangles. Due to the shape of the inner fold-in triangles, the front edge of the central part is located in a plane that lies underneath the swivel axis of the central part. This results in a separation in the vertical direction between the central part and the outer fold-in triangles, which separation makes it possible to overlap the central parts of the two multiple-component attachment parts upon transition into or upon reaching the closed position.

Advantageously, the outer fold-in triangle includes a stop, against which the inner fold-in triangle bears, in sections, in the opened position of the attachment. The stop is used to define the direction of motion of the inner fold-in triangles upon transition into the closed position of the attachment. The stop thereby ensures, when the attachment is transferred from the filling position into the closed position, that the inner fold-in triangle is always moved in the direction of the motion of the multiple-component attachment part.

The one-piece attachment parts and the multiple-component attachment parts are actuated via a swivelling mechanism. The swivelling mechanism is used to harmonize the motion sequence of the individual elements upon transition from the filling position of the attachment into a closed position. To this end, the swivelling mechanism comprises a first lever arrangement and a second lever arrangement, which are used to swivel the multiple-component attachment parts.

The first lever arrangement has a shorter swivel path than the second lever arrangement. Such first and second lever arrangements thereby ensure that the multiple-component attachment part, which has an additional folding plane, always assumes the substantially horizontal closed position first.

BRIEF DESCRIPTION OF THE DRAWINGS

Further features and advantages of the invention will become apparent from the description of embodiments that follows, with reference to the attached figures, wherein:

FIG. 5 presents a detailed view of the FIG. 2 attachment in a transport position;

FIG. 6a presents an enlarged detailed view of a portion of the FIG. 2 attachment;

FIG. 6b presents an enlarged detailed view of a portion of the attachment, as shown in FIG. 3; and FIG. 7 presents a schematic longitudinal sectional view of the attachment, as shown in FIG. 3.

DETAILED DESCRIPTION OF THE PREFERRED EMBODIMENTS

The following is a detailed description of example embodiments of the invention depicted in the accompanying drawing. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
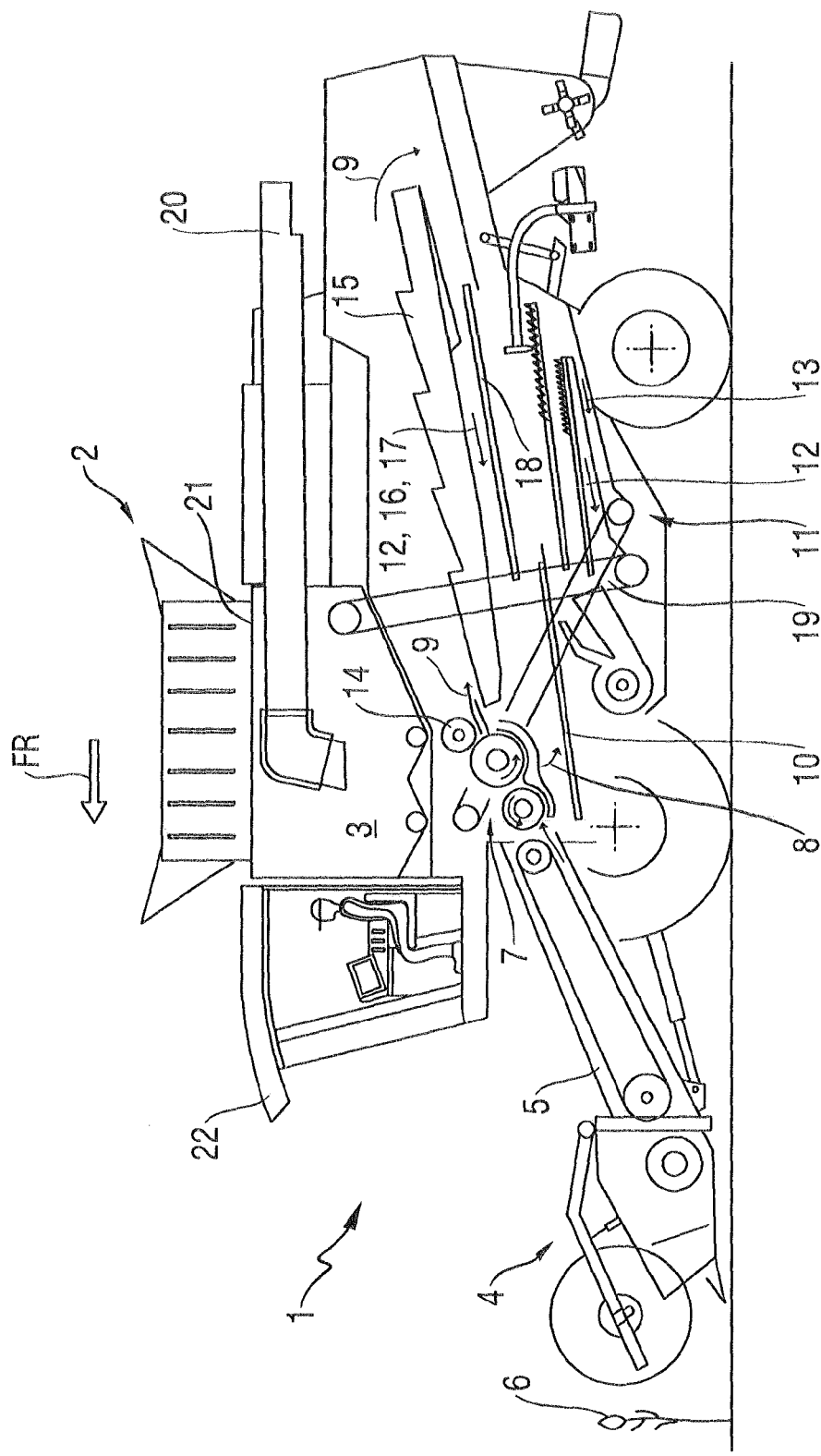
FIG. 1 presents a schematic side view of a combine harvester.

FIG. 1 depicts a combine harvester 1 comprising a foldable attachment 2 for increasing the volume of a grain tank 3. The combine harvester 1 is equipped on the front side with a header 4, which is disposed on a feed rake 5. By means of the header 4, the combine harvester 1 picks up the crop 6 and feeds the crop to the feed rake 5. The feed rake 5 transfers the crop 6 to a downstream threshing mechanism 7. The threshing mechanism 7 prepares the crop 6 by dividing said crop into a grain-chaff mixture 8 and a crop flow 9 composed of threshed-out stalks. The grain-chaff mixture 8 is conveyed via a grain pan 10 directly to a cleaning unit 11. The cleaning unit separates the grain 12 from the non-grain components 13, i.e., from the straw and chaff parts.

An impeller 14 rotating in the counterclockwise direction is disposed behind the threshing mechanism 7 and conveys the crop flow 9 (which comprises the threshed-out stalks), to a tray-type shaker 15. The tray-type shaker 15 separates out any grain 12, broken straw 16, and chaff 17 still present in the crop flow 9. These components are returned via a return pan 18 to the cleaning unit 11. A grain elevator 19 conveys the grain 12 separated by the cleaning unit 11 into the grain tank 3. Grain tank 3 is designed as a container having a substantially rectangular base surface and is usually disposed behind a driver's cab 22 of the combine harvester 1. The container (designed as a grain tank 3), has an upper opening 21, on which the attachment 2 is disposed.

The grain 12 is transferred from the grain tank 3 onto a trailer (not shown) as needed using a grain tank unloading conveyor 20. The attachment 2, which is disposed on the top side of the grain tank 3, is erected in a funnel shape in the working position in order to increase the volume of the grain tank 3. The direction of travel of the combine harvester 1 in harvesting operation is indicated by the arrow FR.

Figure 2:
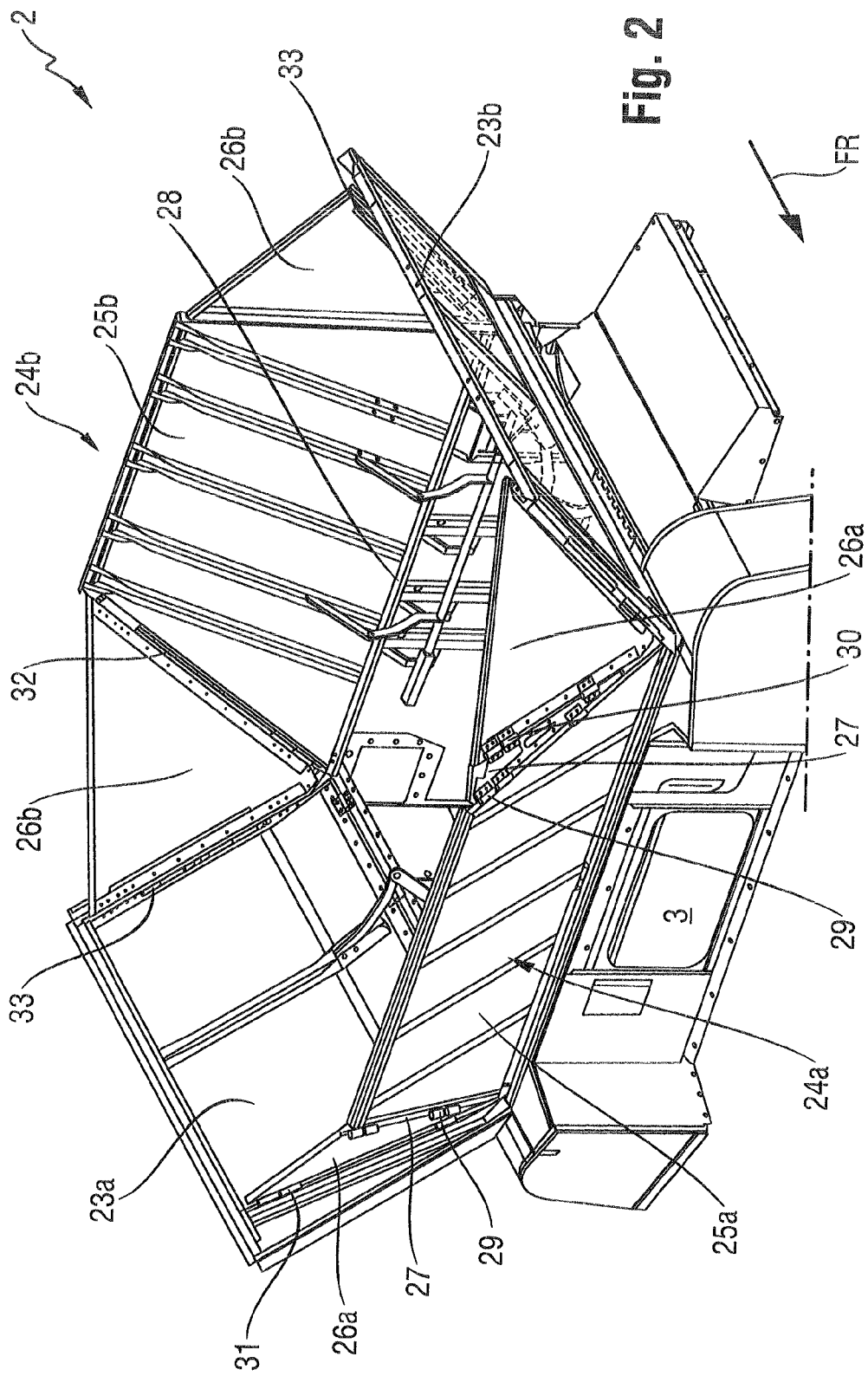
FIG. 2 presents a detailed view of a grain tank with an attachment for increasing the volume of the grain tank, in a working position, of the invention.

FIG. 2 shows the grain tank 3 comprising the attachment 2 in a working position, for increasing the volume of the grain tank 3. The attachment 2 comprises two opposing, one-piece, flat attachment parts 23a, 23b and two opposing, multiple-component, flat attachment parts 24a, 24b. The extension of the one-piece attachment parts 23a, 23b in the longitudinal direction of the combine harvester 1 is greater than the extension of the multiple-component attachment parts 24a, 24b transversely to the combine harvester 1.

In the working position, the one-piece attachment parts 23a, 23b and the multiple-component attachment parts 24a, 24b may be moved (arranged or transferred) into a funnel-shaped position about swivel hinges 28 disposed circumferentially on the upper edge of the grain tank 3. in order to maximize the increase in volume achieved via the attachment 2, the horizontally extending outer edges of the one-piece attachment parts 23a, 23b and the multiple-component attachment parts 24a, 24b are substantially even. Since the overall height of the opposing central parts 25a, 25b is greater than the extension of the one-piece attachment parts 23a, 23b in the longitudinal direction of the combine harvester 1, the central parts 25a, 25b cannot be adjacently arranged via the face sides thereof in the horizontal position.

The multiple-component attachment parts 24a, 24b fold up asymmetrically. The one-piece attachment parts 23a, 23b are disposed in a mirror-image arrangement on the upper opening of the grain tank 3 and extend substantially parallel to the direction of travel FR. The multiple-component attachment part 24a, which, as viewed in the direction of travel FR, faces the cab 22 in the working position of the attachment 2. The multiple-component attachment part 24a comprises a trapezoidal central part 25a, which is bordered by an outer fold-in triangle 26a and an inner fold-in triangle 27a. The outer fold-in triangle 26a and the inner fold-in triangle 27a are disposed in pairs on either side of the central part 25a. The multiple-component attachment part 24b facing away from the cab 22 in the working position of the attachment 2 also comprises a trapezoidal central part 25b, which is bordered by two isosceles fold-in triangles 26b.

The central parts 25a, 25b are each acted upon by the swivel hinge 28 on the upper edge of the grain tank 3. The inner fold-in triangles 27a are swivellably connected to the central part 2 via a first hinge 20. The particular outer fold-in triangle 26a is connected via a second hinge 30 to the adjacent inner fold-in triangle 27a. Furthermore, the particular outer fold-in triangle 26a is connected to the one-piece attachment part 23a via a hinge 31. The central part 25b, which is bordered by only one fold-in triangle 26b in each case, is connected thereto via a hinge 32. The particular fold-in triangle 26b is connected to the adjacent one-piece attachment parts 23a, 23b via a hinge 33. Actuation of the one-piece attachment parts 23a, 23b and the multiple-component attachment parts 24a, 24b is carried out via a swivel mechanism 35 (FIG. 7). The swivel mechanism 35 is known, for example, such as that described in EP 1 564 157 A2, to which reference is therefore expressly made.

Figure 3:
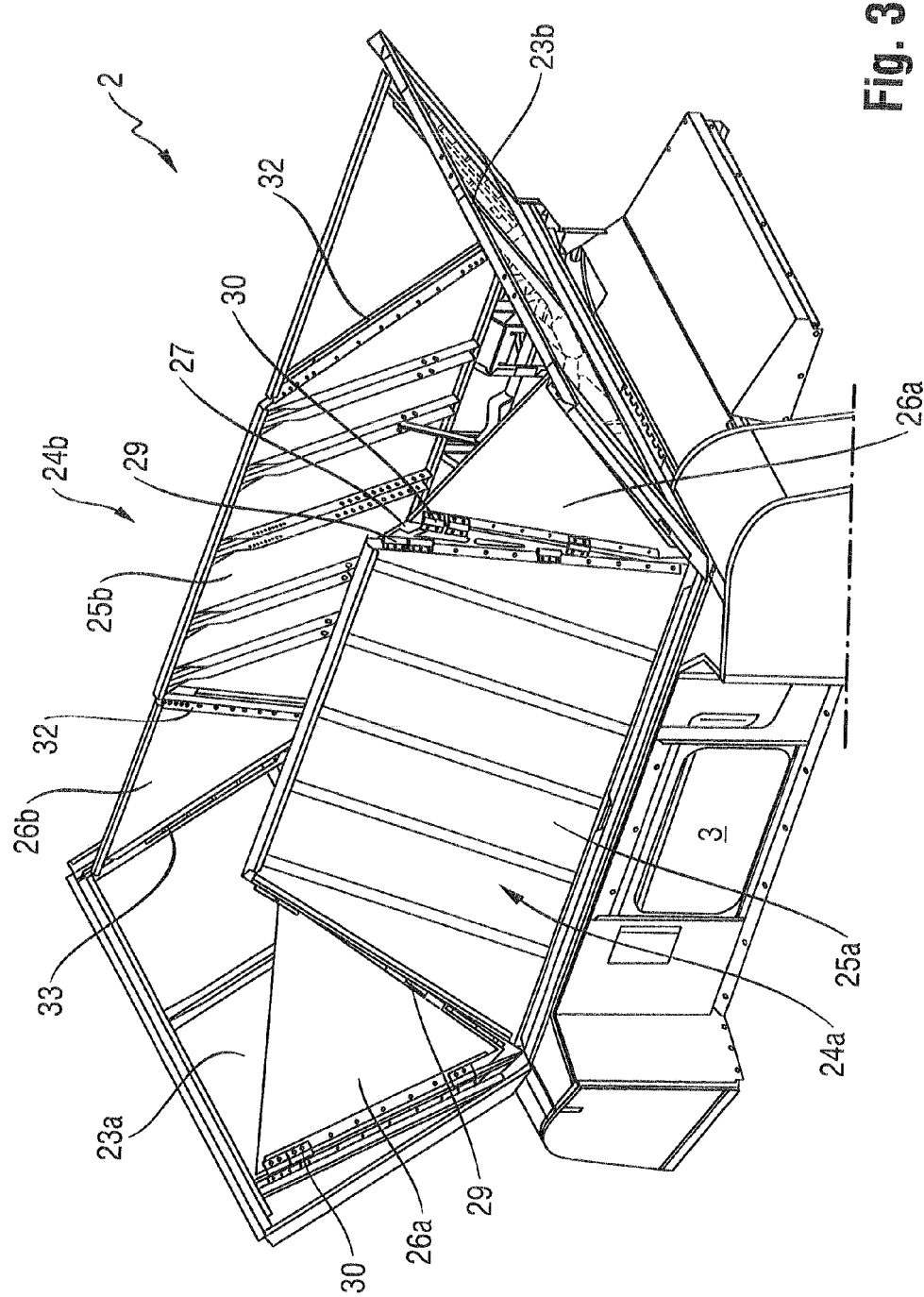
FIG. 3 presents a detailed view of the FIG. 2 attachment in a transition position.

FIG. 3 provides a detailed view of the attachment 2 (FIG. 2) in a transition position. In the transition position, the opposing, multiple-component attachment parts 24a, 24b are swivelled toward one another via the aforementioned swivel mechanism 35. As shown, the motion sequences of the opposing multiple-component attachment parts 24a, 24b differ from one another. The central part 25b and the fold-in triangles 26b of the attachment part 24b facing away from the cab 22 are fanned out, in the transition position, in an approximately vertical plane. The central part 25a and the inner fold-in triangles 27 of the attachment part 24a facing the cab 22 are located in a leading position with respect to the outer fold-in triangles 26a. This is due to the arrangement of the inner fold-in triangles 27 between the central part 25a and the outer fold-in triangles 26a.

The particular inner fold-in corner 27 collapses inwardly by approximately 90° and draws the central part 25a along therewith. The central part is hinge-mounted on the inner fold-in triangles 27. In this position, the central part 25a sags between the inner fold-in triangles 27, which extend substantially perpendicularly to the direction of motion. As the folding process continues, the particular outer fold-in corner 26a lays upon the central part 25a. Due to the inner fold-in triangle 27, a separation in the vertical direction is obtained between the central part 25a and the outer fold-in triangles 26a of the attachment part 24a facing the cab 22. Such arrangement makes it possible for the opposing central part 25b of the multiple-component part 24b to lie upon the central part 25a in sections during the folding process without colliding with the other components of the multiple-component attachment part 24a. Due to the subdivision into the inner fold-in triangle 27 and the outer fold-in triangle 26a, asymmetrical folding of the multiple-component side part 24a is achieved. Such folding is partially decoupled from the forced guidance by the one-piece attachment parts 23a, 23b, to which the multiple-component attachment parts 24a, 24b are swivellably connected via the hinges 31, 33.

Figure 4:
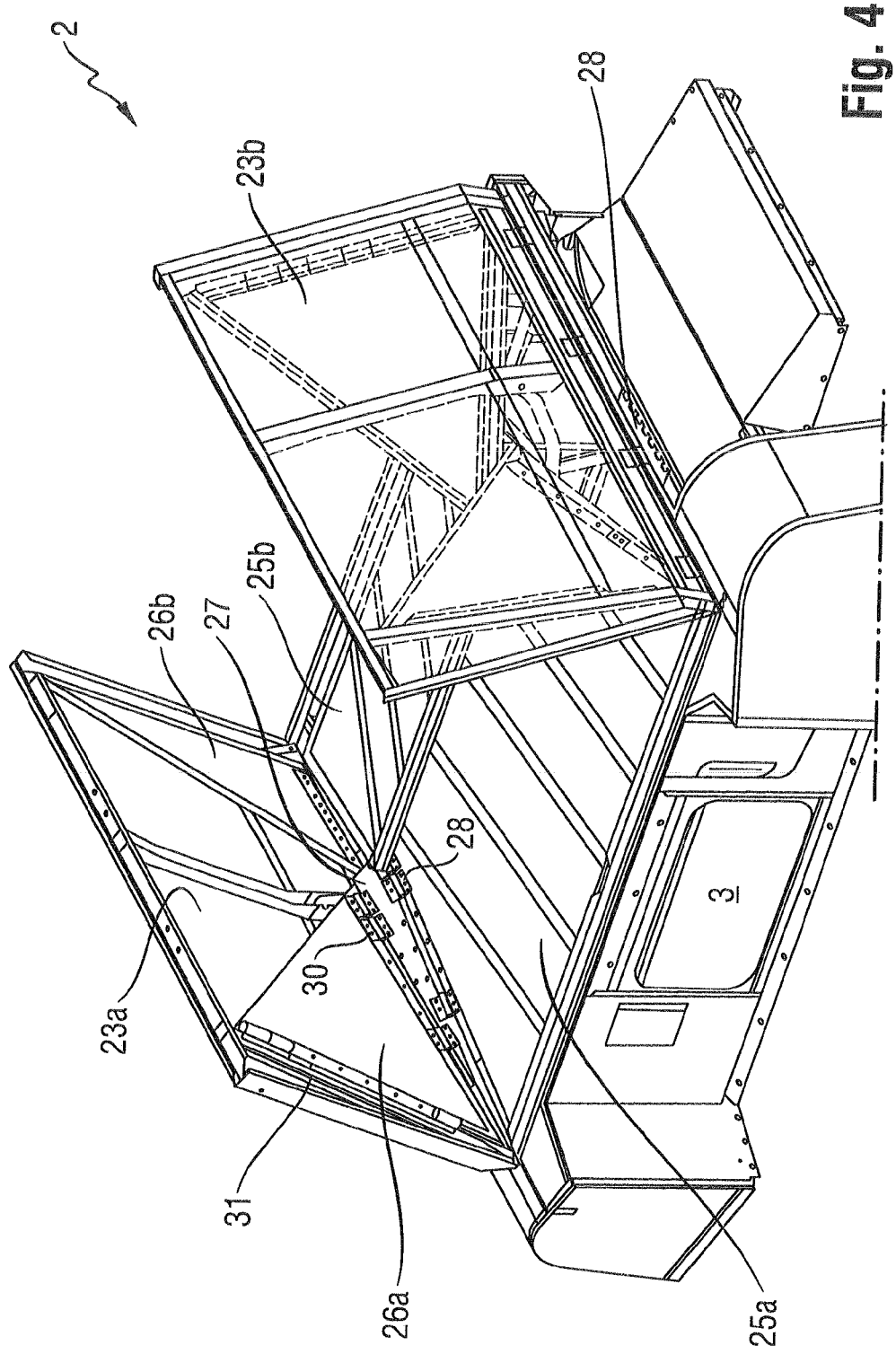
FIG. 4 presents a detailed view of the FIG. 3 attachment in a transition position.

FIG. 4 shows a detailed view of the attachment (FIG. 3) in a transition position, in which the multiple-component attachment parts 24a, 24b are located in the substantially horizontal position and in which the central parts 25a, 25b overlap in sections. The one-piece attachment parts 23a, 23b are moved toward one another in order to assume the closed position of the attachment 2 (FIG. 5). In the closed position, the face sides of the one-piece attachment parts 23a, 23b are disposed opposite one another, thereby forming a flat surface that closes the grain tank 3.

FIGS. 6a and 6b provide detailed views of a section of the multiple-component attachment part 24a facing the cab 22. That is, FIG. 6a shows a view of the inner side of the attachment 2 and, FIG. 6b shows a corresponding view of the outer side of the attachment 2. The views according to FIGS. 6a and 6b show the multiple-component attachment part 24a in the filling position, in which the attachment 2 is erected in a funnel shape. The particular outer fold-in triangle 26a comprises a stop 34, which overlaps the inner fold-in triangle 27 in sections. The stop 34 is designed as a nose-shaped projection, against which the inner fold-in triangle 27 can bear. The stop 34 is used to ensure that, upon transition of the attachment 2 into the closed position via the swivel mechanism 35, the inner fold-in triangle 27 cannot simultaneously move underneath the central part 25a, but rather is located above the central part 25a.

FIG. 7 depicts attachment 2 (FIG. 3) in which the multiple-component attachment parts 24a, 24b are moved and transitioned into the closed position. The one-piece attachment parts 24a, 24b and the multiple-component attachment parts 24a, 24b are moved by means of the swivel mechanism 35 (only partially shown in FIG. 7). The central part 25a is actuated by a first lever arrangement 36 and the central part 25b is actuated by a second lever arrangement 37. The first and the second lever arrangements 36, 37 differ substantially in terms of the path traveled during the swivelling of the particular multiple-component attachment part 24a, 24b. The path traveled by the first lever arrangement 36 is shorter than that of the second lever arrangement 37. Therefore, the multiple-component attachment part 24a facing the cab 22 is located in a position underneath the attachment part 24b facing away from the cab 22. Such arrangement ensures that the multiple-component attachment part 24a facing the cab 22 reaches the closed position before the attachment part 24b facing away from the cab 22. Accordingly, the central part 25a comes to lie in a plane underneath the central part 25b, in order to achieve the overlap in sections. The opposing one-piece attachment ands 23a, 23b are each actuated by a third lever arrangement 38 (only one of which is shown).

The following list of reference signs of various elements mentioned above is included (as follows), for ease of explanation:

LIST OF REFERENCE CHARACTERS 1 combine harvester
2 attachment
3 grain tank
4 header
5 feed rake
6 crop
7 threshing mechanism
8 grain-chaff mixture
9 crop flow
10 grain pan
11 cleaning unit
12 grain
13 non-grain component
14 impeller
15 tray-type shaker
16 broken straw
17 chaff
18 return pan
19 grain elevator
20 grain tank unloading conveyor
21 upper opening
22 cab
23a one-piece attachment part
23b one-piece attachment part
24a multiple-component attachment part
24b multiple-component attachment part
26a central part
25b central part
26a outer fold-in triangle
26b outer fold-in triangle
27 inner fold-in triangle 28 swivel hinge
29 first hinge
30 second hinge
31 hinge
32 hinge
33 hinge
34 stop
35 swivel mechanism
36 first lever arrangement
37 second lever arrangement
38 third lever arrangement
FR direction of travel As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A combine harvester (1) comprising:
   a grain tank (3) having an upper opening (21); and
   a foldable attachment (2) disposed on the upper opening (21), the foldable attachment comprising two opposing, one-piece, flat attachment parts (23a, 23b) and two opposing, multiple-component, flat attachment parts (24a, 24b),
   wherein the one-piece and multiple-component attachment parts (23a, 23b, 24a, 24b) are swivellably disposed on the upper edge of the upper opening (21) of the grain tank (3), are swivellably connected to one another and in lying-flat, closed positions, form a cover that at least partially closes the opening (21), and in erected filling positions, increase the volume of the grain tank (3); and
   wherein the multiple-component attachment parts (24a, 24b) comprise a trapezoidal central part (25a, 25b), which are bordered by an outer fold-in triangle (26a, 26b) and an inner fold-in triangle (27), respectively, whereby a corner fold-in triangle (26a, 26b) and the inner fold-in triangle (27) are disposed in pairs on either side of the trapezoidal central part (25a, 25b),
   wherein an inner fold-in triangle (27) and the outer fold-in triangle (26a, 26b) of one of the pairs are interconnected via a first hinge (29),
   wherein the inner fold-in triangle (27) is swivellably connected via a second hinge 30 to the central part (25a),
   wherein the inner fold-in triangles (27) of the multiple-component attachment parts (24a) function as spacers in the closed position thereof, and
   wherein the inner fold-in triangles (27) tilt inwardly upon transition from the filling position into the closed position and are transferred into a substantially perpendicularly downwardly extending position.

2. The combine harvester (1) according to claim 1, wherein a multiple-component attachment part (24a, 24b) is formed of a trapezoidal central part (25a) bordered by two fold-in triangle pairs (26a, 27), and wherein the fold-in triangle pairs (26a, 27) each comprise an inner fold-in triangle (27) facing the trapezoidal central part (25a) and an outer fold-in triangle (26a) facing the one-piece attachment part (23a, 23b).

3. The combine harvester (1) according to claim 2, wherein the outer fold-in triangle (26a) comprises a stop (34), against which the inner fold-in triangle (27) bears, in sections, in the opened position of the attachment (2).

4. The combine harvester (1) according to claim 1, wherein the one-piece attachment parts (23a, 23b) and the multiple-component attachment parts (24a, 24b) are actuated via a swivelling mechanism (35).

5. The combine harvester (1) according to claim 4, wherein the swivelling mechanism (35) comprises a first lever arrangement (36) and a second lever arrangement (37), the first and second lever arrangements used to swivel the multiple-component attachment parts (24a, 24b).

6. The combine harvester (1) according to claim 5, wherein the first lever arrangement (36) has a shorter swivel path than the second lever arrangement (37).

* * * * *